United States Patent [19]
McAvoy

[11] 3,799,202
[45] Mar. 26, 1974

[54] POWER TRANSMISSION
[75] Inventor: Dennis J. McAvoy, Rochester, Mich.
[73] Assignee: Sperry Rand Corporation, Troy, Mich.
[22] Filed: Nov. 29, 1972
[21] Appl. No.: 310,288

[52] U.S. Cl............... 137/625.61, 91/49, 91/51, 92/131
[51] Int. Cl........................ F15b 13/04, F15b 31/00
[58] Field of Search............ 91/49, 51, 387; 92/131; 137/625.61

[56] References Cited
UNITED STATES PATENTS

| | | | |
|---|---|---|---|
| 2,867,233 | 1/1959 | Adelson | 91/51 |
| 2,995,116 | 8/1961 | Dobbins | 91/51 |
| 3,076,442 | 2/1963 | Raeber | 91/51 |
| 3,285,139 | 11/1966 | Hunth | 91/51 |
| 3,537,355 | 11/1970 | Bliss | 91/51 |

*Primary Examiner*—Paul E. Maslousky
*Attorney, Agent, or Firm*—Theodore Van Meter

[57] ABSTRACT

In a hydraulic power transmission apparatus, the position of the spool of a directional valve is remotely and infinitely variably positionable to either side of a center position by a duplex hydraulic bridge circuit. Each branch of the circuit has three restrictions in it between a pilot pressure source and an exhaust point, the middle restriction being a relief valve adjustable in accordance with the position of the directional valve spool; one of the other two restrictions being fixed and the third restriction being adjustable for command purposes.

3 Claims, 1 Drawing Figure

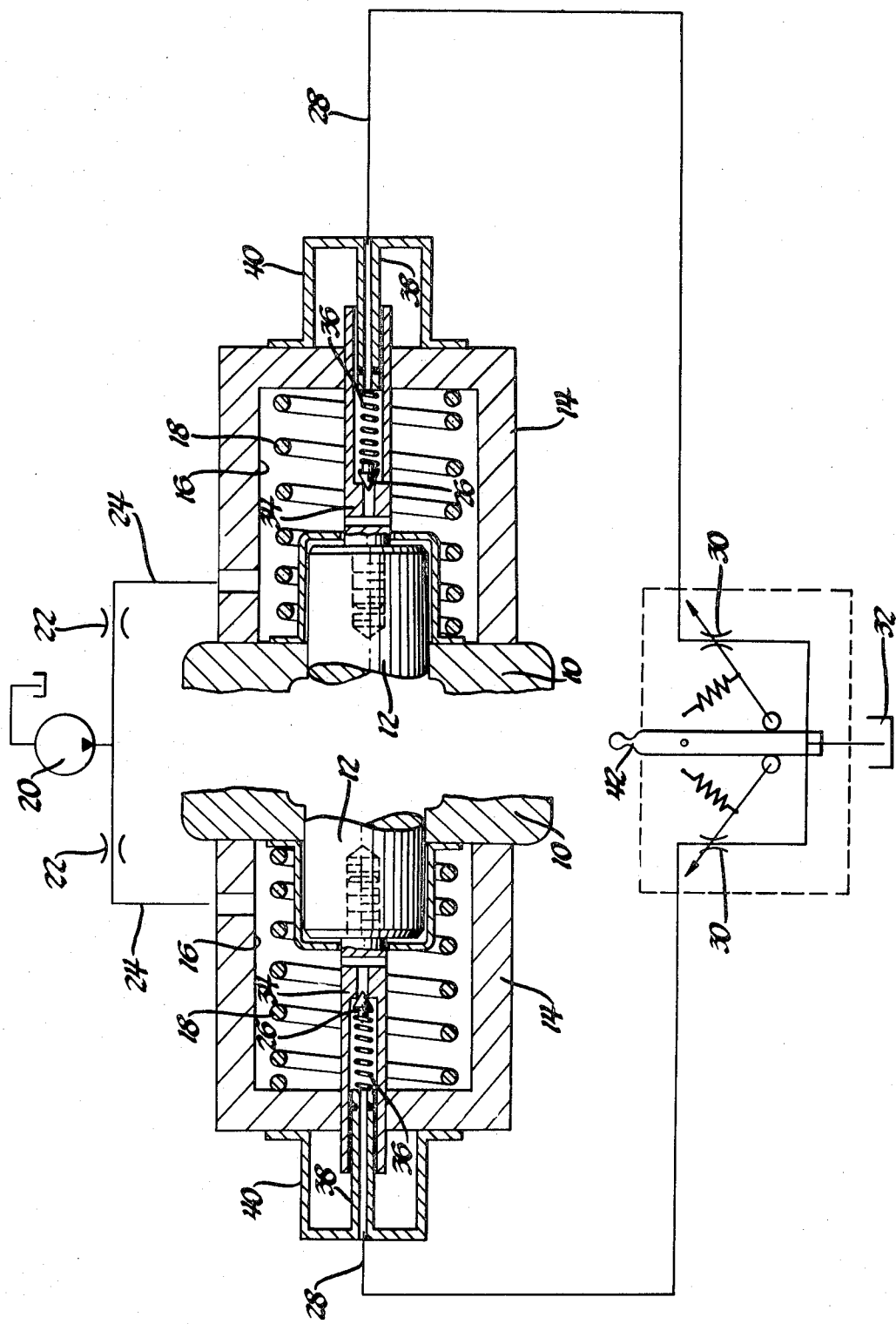

POWER TRANSMISSION

Modern hydraulic power transmission apparatus finds an increasing need for the remote positioning of the control elements such as directional valves which become larger and more difficult to accurately position as the demands for higher power output of the apparatus are imposed. A common method for remote positional control involves the use of a hydraulic bridge circuit which permits remote control without the use of mechanical connections between the signal input device and the device to be positioned. Where a load device such as a directional valve is to be shifted variably on either side of a center position, systems such as that disclosed in the patent to Breeden U.S. Pat. No. 3,613,730, suffer the drawbacks of having a rather small range of control pressure between zero and maximum positional displacement and as a result have rather poor metering capabilities. That is to say, their repeatable accuracy is somewhat low. On the other hand, the use of adjustable relief valves in a bridge circuit has been found to alleviate these difficulties, but has not heretofore been adaptable to devices requiring position control on either side of a central position. See, for example, the patent to Doe, U.S. Pat. No. 2,177,098.

The present invention aims to overcome the difficulties experienced with both these types of remote control so that large directional valves and other load members may be accurately positioned to either side of a central position from a remote location by command signals transmitted solely through fluid conduits.

The invention comprises a remote control system for hydraulic power transmission apparatus comprising a load member to be adjusted to an infinite number of positions on each side of a center position, opposed expansible chamber means for shifting the load member, a source of pilot operating fluid, and a pair of bleed circuits extending from the source to an exhaust point, each bleed circuit extending through a first orifice to one of the expansible chamber means, thence through an adjustable relief valve, and thence through a second orifice to exhaust, one of the orifices of each pair being adjustable for generating a command signal in one bleed circuit and the relief valve in the other bleed circuit being adjustable by motion of the load member to generate a feedback signal in said other bleed circuit.

IN THE DRAWING

The single FIGURE represents a diagrammatic view of a remote control system embodying a preferred form of the present invention.

A load member to be remotely positionable on either side of center such as a hydraulic directional valve is indicated by a body 10 and a spool 12. There are many well-known types of such valves used for controlling the flow of fluid between the hydraulic pressure source and one or more hydraulic motors or actuators. With such valves, it is frequently desired to modulate the flow so as to accurately control the speed of the motor or actuator and this requires rather precise positioning of the spool relative to the body.

For this purpose, the directional valve may be provided with duplicate end caps 14, each containing a chamber 16 in which hydraulic pressure may be applied to shift the end of the spool 12 out of the chamber, with the spool acting as a piston. Springs 18 in each chamber serve to hold the spool centered when the pressure in each chamber is the same.

The source of pilot fluid pressure is indicated at 20 which delivers a continuous flow of pressure fluid to an identical pair of bleed circuits through which the remote positioning control of spool 12 is accomplished. Each bleed circuit comprises a first orifice 22 in a line 24 leading into a chamber 16. The bleed circuit then passes through the spring loaded relief valve 26 and through a line 28 to an adjustable restrictor 30 and thence to exhaust or tank indicated at 32.

Each relief valve 26 is mounted in a tubular extension 34 secured to the spool 12. Each spring 36, which determines the cracking pressure of relief valve 26, abuts against a fixed tubular member 38 contained in an auxiliary end cap 40. The member 38 also serves as a conduit feeding the exhaust from valve 26 to the line 28.

The variable orifices 30 are controlled by a common control lever 42 which is swingable from the neutral position illustrated to increasingly close one or the other of the orifices 30 while leaving the other or the one fully open.

In operation with the parts in the position illustrated, the spool 12 is maintained in center position, both by the springs 18 and by the symmetry of the variable members of the left and right-hand bleed circuits. Thus, the pressure in both chambers 16 will be equal. If it is desired to position the spool 12 a certain distance to the left of center position, the handle 42 may be moved to the left, thus closing down the variable orifice 30 on the right to a certain amount. This raises the pressure in the right-hand chamber 16 and since the pressure in the left-hand chamber 16 has not as yet changed, will cause the spool 12 to move to the left. This, however, starts to compress the spring 36 of the left-hand relief valve 26 and introduces additional restriction in the left-hand bleed circuit downstream from its chamber 16. When the spool 12 has moved leftwardly a sufficient distance to build up a pressure in left-hand chamber 16 equal to that in right-hand chamber 16, motion of the spool 12 will stop and the spool 12 will remain in this position so long as the handle 42 remains in its position of command.

The range of control pressures which become available with this system is much wider than with previous systems and is determined to a large extent by the spring rates chosen for the main centering springs 18 and the relief valve springs 36. It is feasible, for example, to completely omit the centering springs 18 and to rely upon relief valve springs 36 to establish a balance at center position. The springs 36, moreover, may be chosen with any desired degree of compression at the neutral position illustrated. Thus, for example, if in this position the springs 36 are so chosen that they are without preload, then the pressure generated in chamber 16 in response to a command signal from handle 42 depends solely upon the degree of restriction at orifice 30. On the other hand, if the springs 36 are substantially preloaded, the commanded pressure in chamber 16 will depend both upon the degree of restriction at orifice 30 and the degree of relaxation of spring 36. However, the spring 36 at the opposite end of the spool will have more rapidly built up the feedback pressure signal in its chamber 16 due to its precompression.

While the downstream orifices 30 have been illustrated as adjustable for command purposes, it is also within the scope of this invention to make the upstream orifices 22 adjustable for command purposes with orifices 30 remaining fixed.

I claim:

1. A remote control system for hydraulic power transmission apparatus comprising a load member to be adjusted to an infinite number of positions on each side of a center position, opposed expansible chamber means for shifting the load member, a source of pilot operating fluid, and a pair of bleed circuits extending from the source to an exhaust point, each bleed circuit extending through a first orifice to one of the expansible chamber means, thence through an adjustable relief valve, and thence through a second orifice to exhaust, one of the orifices of each pair being adjustable for generating a command signal in one bleed circuit, and the relief valve in the other bleed circuit being adjustable by motion of the load member to generate a feedback signal in said other circuit.

2. A system as defined in claim 1 wherein the expansible chamber means and the adjustable relief valve of each bleed circuit are constructed as a unitary assembly suitable for attachment as end caps to a body and a spool of a hydraulic directional valve.

3. A system as defined in claim 1 having spring means for centering the load member when no signal is being generated.

* * * * *